3,499,970
BUS CONDUCTOR SYSTEM FOR A THREE-PHASE
ELECTRIC FURNACE
Yoshinosuke Tada and Makoto Horie, Nagoya, and Katsuya Fukuoka, and Yasunobu Hosoi, Chita District, Japan, assignors to Yahagi Seitetsu Kabushiki Kaisha, Nagoya, Japan, a corporation of Japan
Filed June 26, 1968, Ser. No. 740,237
Claims priority, application Japan, July 3, 1967, 42/42,328
Int. Cl. H05b 7/10
U.S. Cl. 13—14                                            1 Claim

ABSTRACT OF THE DISCLOSURE

A bus conductor system for a three-phase electric furnace, whereby the length of one-way bus conductors of each phase is minimized and equalized, comprising multiple both-way bus conductors, rearranging points of said multiple both-way bus conductors into one-way conductors located at equidistant and proximate positions from adjacent terminal rings, the terminal rings being supported around each electrode concentrically, groups of flexible conductors being suspended by suspending rings around each electrode in an inverse U-shape and the suspending rings being movable vertically according to the movement of electrodes.

---

This invention relates to a bus conductor system for a three phase electric furnace, more particularly to a bus conductor system from secondary terminals of a transformer to the corresponding electrodes of an electric furnace of various kinds, especially a heavy current three phase electric furnace for heating, melting and smelting metallic and non-metallic materials, which enables to minimize and well balance the reactance of bus conductors of each phase. Thereby, the bus conductor system according to the present invention considerably improves the power factor of the circuit, to increase the effective load power and at the same time enables control of the load power characteristics of the heating or smelting zone for each electrode and attains a suitable condition for operation easily and exactly.

The unit size of an electric furnace tends to become larger, and hence, the bus conductors connecting a transformer to the electrodes inevitably become longer. In well-known and conventional bus conductor systems which have been used widely heretofore, only one-way bus conductors are disposed above the furnace, although multiple both-way bus conductors, for instance, sandwich or interlace bus conductors connected to positive and negative terminals of each phase of a transformer, are used except above the furnace. Therefore, as the hearth area of the furnace expands, the distance from the periphery of the furnace to each electrode thereof increases and the length of each one-way bus conductor becomes longer.

If A.C. bus conductors are made in the form of both-way arrangement consisting of a number of parallel flat and thin conductors disposed as close to each other as possible, to form the so-called multiple both-way bus conductor arrangement, the reactance thereof can be minimized, because the magnetic flux generated by the current through each conductor element cancels each other effectively. For instance, when a both-way bus conductor arrangement is made of four flat copper plates of 12 mm. x 250 mm. for each one-way with a spacing of 10 mm. the inductance of such both-way bus conductor arrangement is $4.2 \times 10^{-9}$ h./m. In other words, the reactance of such both-way bus conductor arrangement as 60 cycle A.C. system is only $1.6 \times 10^{-6}$ ohm/m. Thus, with the multiple both-way bus conductor arrangement, the reactance thereof is negligibly small.

On the other hand, in the case of one-way bus conductor arrangement, such reduction of reactance cannot be expected by reason of the long distance from other buses and their phase of current. For instance, if one-way bus conductor elements of the aforesaid both-way bus conductors are straightly extended, the inductance and reactance at 60 cycles of the thus extended one-way portion is about $92.8 \times 10^{-9}$ h./m. and $35.2 \times 10^{-6}$ ohm/m., respectively, i.e. several ten times as large as those of the both-way bus conductor arrangement. Therefore, when the one-way bus conductor arrangements become longer and more complex, the reactance thereof becomes large. Furthermore, the unbalance of reactance between different phase bus conductor arrangements is also increased.

For a smooth operation, for example, of electric smelting furnaces, in which raw materials charged are continuously molten and smelted by submerging electrodes into the materials to feed high electric current, it is of essential importance to control the factors concerned with electrical load characteristics of the smelting zone under each electrode, such as the D.C. resistance, reactance, voltage, current and electrical load, etc., to a constant and balanced level. It is not only insufficient but also disadvantageous, in the case of the unbalanced reactance of each circuit to control simply the current of each electrode, which has heretofore been adopted conventionally, because it means control of impedance only.

Recently, measuring instruments of D.C. resistance and reactance of electric circuit have been introduced to the control of electric smelting furnace. However, such measurement alone does not provide a guide or means of fundamental resolution of furnace operating technique.

In short, with well-known bus conductor arrangements of electric furnaces, the one-way bus conductor becomes longer, as the furnace size becomes larger, which causes an increase in reactance of each phase as well as unbalance thereof. Such increased and unbalanced reactance results not only in a reduced power factor, but also additionally in complicated difficulties for control of electric furnace operation. Especially, the unbalance of load power among different phases causes the so-called wild phase and dead phase, so that both uniform load and smooth operation of the furnace cannot be achieved.

Therefore, an object of the present invention is to obviate such defects of well-known bus conductor arrangements of electric furnaces, by providing a special three phase bus conductor system.

Other objects and a fuller understanding of the present invention may be had by referring to the following description, taken in conjunction with the accompanying drawings, in which:

FIGS. 1a, 1b, 2a, and 2b are diagrammatic illustrations of well-known three phase bus conductor systems;

Like parts are designated by like numerals and symbols throughout the drawings.

Figure 1A:
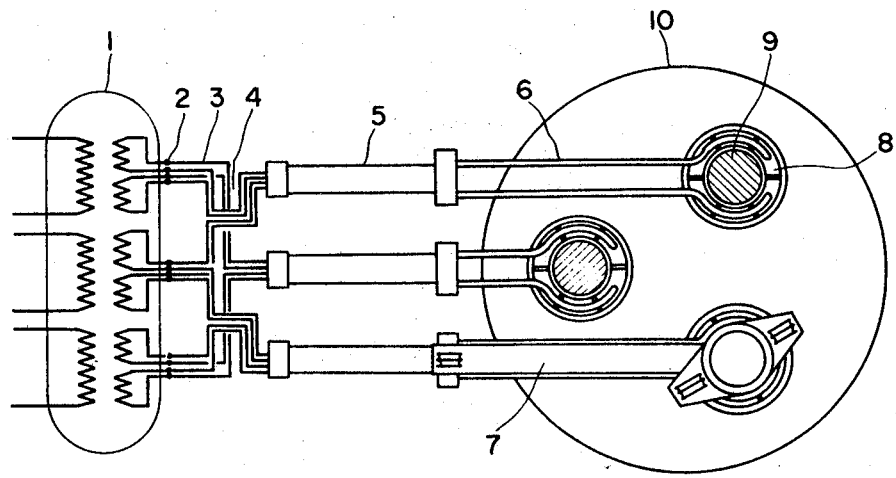
Figure 1B:
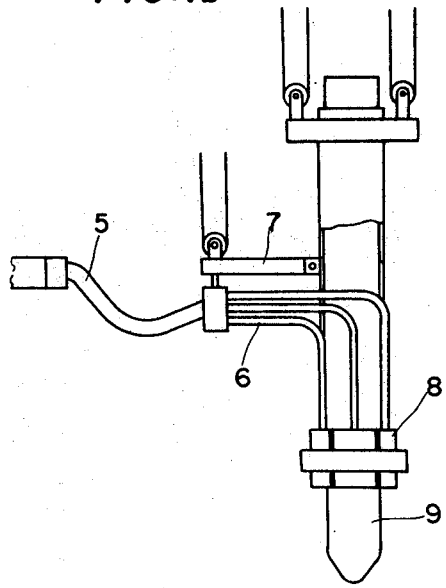

FIGS. 1a and 1b illustrate an example of the well-known bus conductor systems which have been commonly used. A transformer 1 has positive and negative secondary terminals 2 for a unit winding of each phase. Bus conductors are connected to said positive and negative terminals in such manner that multiple both-way bus conductors 3 are formed at each phase. For simplicity, the figures show double both-way bus conductors. Usually, the both-way bus conductors 3 are rearranged at conductor rearranging portion 4 so as to form delta connection. The connection between the rearranging portions 4 and electrodes 9 is a one-way circuit and includes flexible conductors 5, water-cooled pipe conductors 6, and electrode contact pieces 8. The flexible conductors 5 allow vertical movement of the electrodes 9. The pipe conductors 6 are supported by suitable supporting means, such as beams 7.

In order to prevent the flexible conductors 5 from being heated by a furnace 10 and to prevent them from coming into contact with the furnace body when the electrodes 9 are lowered, it is preferable to dispose the flexible conductors 5 away from the top of the furnace.

Thus, the total length of the one-way conductors, from the flexible conductors 5 to the electrode contact pieces 8, becomes very long. Moreover, it is extremely difficult to form the aforesaid one-way bus conductor arrangements of different phases in the same length. Accordingly, the reactance of such one-way bus conductor arrangements is large and not balanced. Hence, the aforementioned defects are caused. The delta connection can be made just before the electrode contact pieces 8 or through the electrodes 9 per se, but such connection does not affect decrease of the reactance.

Figure 2A:
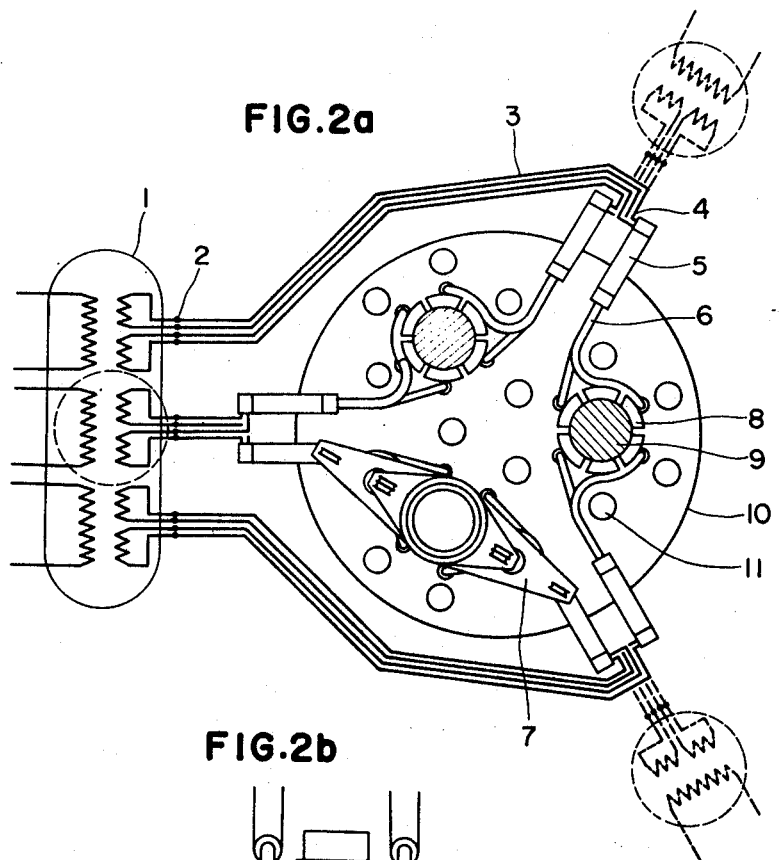
Figure 2B:
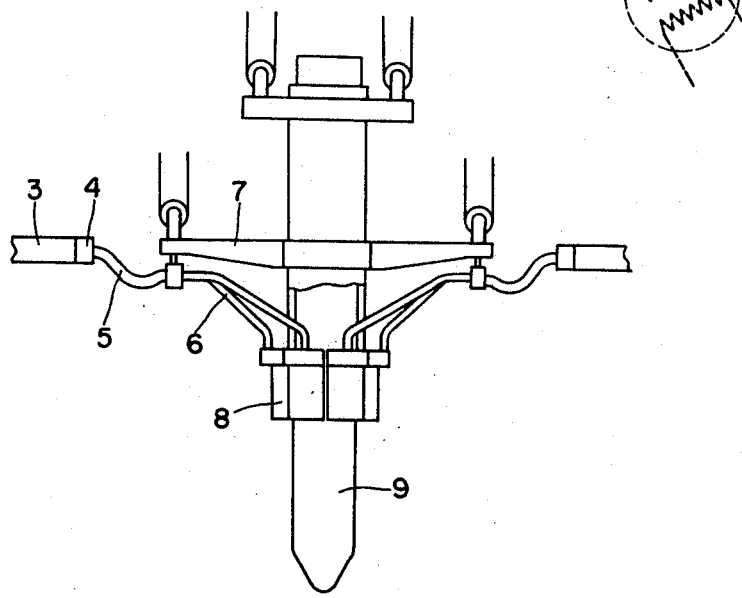

To avoid the defects of the bus conductor arrangement of the preceding example, especially in the case of electric smelting furnaces, an improved bus conductor system, as depicted in FIGS. 2a and 2b, was proposed and has been most widely used recently. Referring to the figures, multiple both-way bus conductors 3 of each phase extend from secondary terminals 2 of a furnace transformer 1 to an intermediate position between adjacent electrodes 9 along the periphery of the furnace top. Rearranging portions 4 of each phase are disposed at the thus extended end of the both-way bus conductors 3, and positive and negative conductors thereof are rearranged to form one-way bus conductors which are connected with flexible conductors 5. The one-way bus conductors further extend to water-cooled pipe conductors 6, which are connected with electrodes 9 through electrode contact pieces 8. The pipe conductors 6 are supported by vertically movable support beams 7 fixed to each electrode 9.

In the bus conductor system of FIGS. 2a and 2b, single-phase one-way bus conductors, or water-cooled pipe conductors 6, are located on both sides of each electrode 9, so that delta connection is made through the electrodes 9. It is also possible to provide terminal rings (not shown) above the electrode contact pieces 8, so as to make the delta connection at such terminal rings. Furthermore, instead of a three phase transformer 1, as shown by solid lines, three single-phase transformers can be used, as shown by dotted lines in the figure.

With the bus conductor system of FIGS. 2a and 2b, the length of the one-way bus conductors to each electrode 9 can be made equal for different phases, so that the balance among reactances of each phase may be fairly improved. However, the one-way bus conductors of each phase are still considerably long. Although there is produced mutual reactance between positive and negative flexible conductors 5 of each phase, which are disposed apparently in parallel with each other, the reduction of total reactance is rather small depending on the relative disposition and spacing therebetween. And such reactance changes by the variation in the relative height of adjacent electrodes 9. Thus, although the balance among reactances of the three phase bus conductors may be improved, as compared with that of the preceding example, it is possible to keep them always balanced and to achieve substantial reduction of reactance.

Furthermore, especially in the case of a closed type electric smelting furnace, a large number of raw material feeding pipes 11 are disposed around each electrode. The bus conductor system of FIGS. 2a and 2b tends to interfere with proper disposition of such raw material feeding pipes 11. Unless such feeding pipes 11 are made of non-magnetic substance, the reactance of each phase is adversely affected by the existence of such feeding pipes 11.

The inventors had disclosed, in their Japanese Patent No. 214,297 titled "An Electric Furnace," a special electrode assembly, particularly suitable for Söderberg self-baking electrodes, which comprises stationary rings connected with bus conductors around each electrode, electrode contact pieces, groups of flexible conductors connecting said stationary terminal rings to said electrode contact pieces, and movable rings suspending said flexible conductors around each electrode cylindrically. Now the inventors succeeded in accomplishing an excellent bus conductor system for a three phase electric furnace which can obviate the above-mentioned defects, by improving said patent, which relates to a special electrode assembly, and combining it with a distinctive bus conductor system.

The inventors noticed the fact that the stationary terminal rings of said patented assembly can be fastened at a certain position while allowing the vertical movement of the electrode per se. By taking advantage of such fact, multiple both-way bus conductors can be disposed from secondary terminals of a furnace transformer to each equidistant and nearest point from the adjacent stationary terminal rings of each electrode. In other words, the multiple both-way bus conductors can be brought as close to a middle point between adjacent electrodes as possible, and then connected at said middle point to form positive and negative one-way bus conductors leading to the stationary terminal rings of the adjacent electrodes, respectively, through the shortest possible paths. Thereby, the length of the one-way bus conductors in the bus conductor arrangement from the transformer secondary terminals to the electrode contact pieces, can be reduced practically to a minimum and equal to each other. Therefore, substantially all bus conductors can be constructed by both-way bus conductors, and hence, an excellent bus conductor system with considerably improved electric characteristics of reduced and balanced reactance has been obtained.

Referring to FIGS. 3a, 3b, 3c, and 3d, multiple both-way bus conductors 3 of each phase extend from secondary terminals 2 of a transformer 1 to a middle point of adjacent stationary terminal rings 12. The middle point is at the equal and shortest distance from said two adjacent stationary terminal rings 12, respectively. In the particular embodiment, as illustrated in the figures, the multiple both-way bus conductors 3 terminate at the very middle point of the two adjacent stationary terminal rings. Moreover, the multiple both-way bus conductors 3 can be terminated at a suitable point on the equidistant line from adjacent stationary terminal rings, depending on other conditions of the furnace design, such as the distance between the two adjacent stationary terminal rings, the positions of raw material feeding pipes, etc. At rearranging portions 4, the multiple both-way bus conductors are rearranged into positive and negative one-way bus conductors leading to the two adjacent stationary terminal rings 12, respectively.

Thus, practically the entire span of the bus conductors between the furnace transformer 1 and the stationary terminal rings 12 of each phase can be constructed by multiple both-way bus conductors. Even when the multiple both-way bus conductors 3 terminate in the proximity of the aforesaid middle point of the two adjacent electrodes, the length of each one-way bus conductor can be made equal and negligibly short. And the multiple both-way bus conductors 3 of each phase can be, partially or wholly, constructed by connecting plates, pipes or flexible conductors, which can be water-cooled, if desired.

Figure 3A:
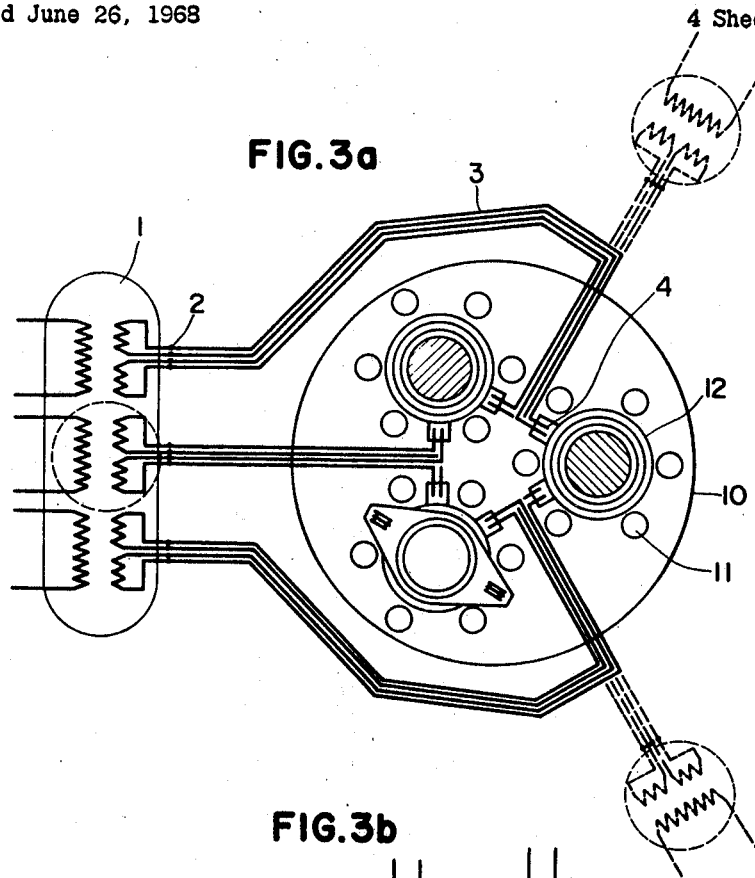
FIG. 3a is a schematic plan of one example of a three phase bus conductor system, according to the present invention.
Figure 3B:
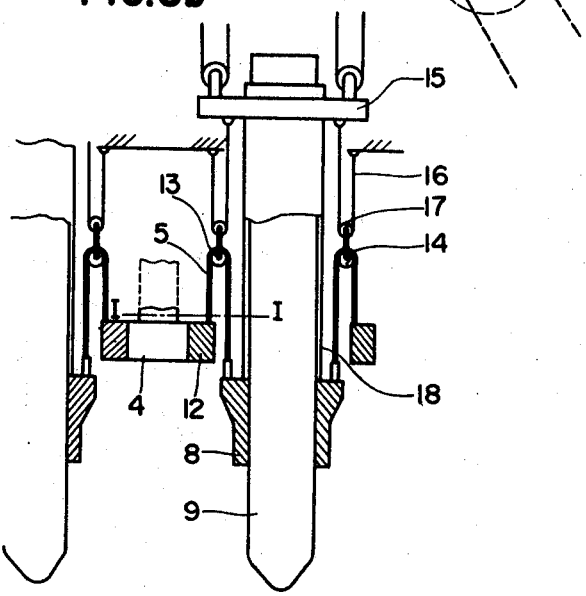
FIG. 3b is a partial elevation of the bus conductor system, shown with a part thereof in section.
Figure 3C:
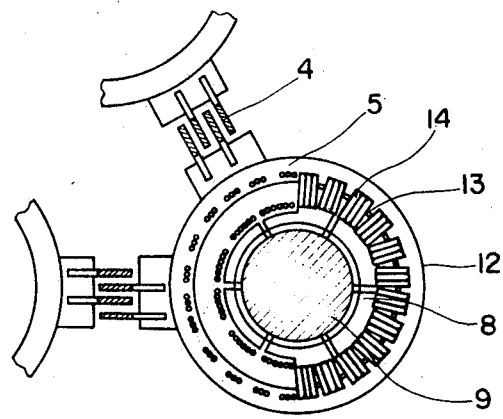
FIG. 3c is an enlarged sectional view, taken on the line C—C of FIG. 3b.
Figure 3D:
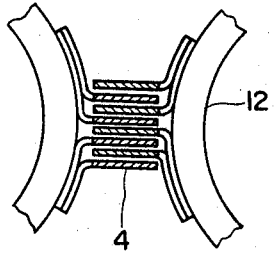
FIG. 3d is an enlarged partial plan of a bus conductor rearranging portion.

There are a number of different ways to rearrange the multiple both-way bus conductors 3 at the rearranging portions 4. FIG. 3d illustrates an example of preferable rearranging ways according to the present invention. The stationary terminal rings 12 are suspended by a suitable supporting member around each electrode at a position higher than the electrode contact pieces 8, but as low as possible from the standpoint of operation. Groups of flexible conductors 5 are connected to each stationary terminal ring 12 at one end thereof. The other ends of the flexible conductors 5 are connected to the electrode contact pieces 8. The flexible conductors 5 are suspended by suspension ring means 13, which can move according to the vertical movement of the electrodes 9. The suspension ring means 13 are made of non-magnetic substance. The groups of flexible conductors 5 thus suspended appear to be a double layered cylindrical arrangement surrounding each electrode 9. The suspension ring means 13 of the flexible conductors can be formed by a number of pulleys 14 disposed radially along a circle concentric with the periphery of each electrode 9, as depicted in FIGS. 3b and 3c. In order to allow vertical movement of the electrode 9 without slackening the flexible conductors 5, the flexible conductor suspending ring means 13 can preferably be suspended by a plurality of pulleys 17, which are hung by wire ropes 16 having one end thereof fastened to a structural member and the other end thereof secured to a mantle cylinder support arm 15 of the electrode 9.

With such construction of the flexible conductors 5, many advantageous features can be obtained as follows. The stroke of the vertical movement of the electrode 9 can be about as long as the full length of the flexible conductors 5.

According to the present invention, flexible conductors 5 hung by a suspending ring so as to form a double layered cylindrical arrangement are so soft and freely bendable that the radius of curvature at the suspending ring portion can be made very small. By narrowing the spacing between the inner and outer layers of the double layered cylindrical arrangement of the groups of the flexible conductors 5, as depicted in FIG. 3b, the magnetic flux due to the current through the inner layer can be substantially cancelled by the flux due to the current through the outer layer, so that the reactance can be reduced similarly in the both-way bus conductor arrangement. Besides, by the cylindrical arrangement of the groups of flexible conductors 5, there is substantially no leakage magnetic flux inside thereof. As a result, even when a mantle cylinder 18 of the electrode 9 is made of ferro-magnetic substance, such as mild steel, there is practically no induction loss.

In other words, the reactance of the conductors between the stationary terminal ring 12 and the electrode contact pieces 8 can be reduced to a negligibly low level, by reducing the vertical distance between the stationary terminal ring 12 and the electrode contact pieces 8 as far as possible, and arranging the flexible conductors 5 over the whole length between the stationary terminal ring 12 and the contact pieces 8 in a double layered cylindrical arrangement.

The stroke of the vertical movement of the electrode can be extended without causing any increase in the reactance in this portion of the conductors. Moreover, according to the present invention, the space above the furnace can be effectively and widely used for installation of other apparatus, such as raw material feeding pipes, except for the very small area occupied by both the stationary terminal rings 12 and the stationary both-way bus conductors 3.

Even when a certain vertical distance is required between the stationary terminal ring 12 and the electrode contact pieces 8, due to operative conditions of the furnace, and the single layered cylindrical flexible conductor portion becomes longer, the leakage flux from such cylindrical conductor portion toward the electrode can be still kept extremely small. Moreover, the large diameter of such cylindrical conductor portion results in a large self geometrical mean radius for inductance calculation. Hence, the reactance of such cylindrical conductor portion can be kept considerably smaller, as compared with other well-known bus conductor arrangements. Thus, with the bus conductor system of the present invention, the reactance variation caused by vertical movement of the electrode can be limited to an extremely narrow range, as compared with considerably large variation of reactance at the corresponding flexible conductor portion of other well-known bus conductor systems.

Various electric characteristics of an embodiment of the bus conductor system of a 60 cycle three phase electric smelting furnace according to the present invention are as follows:

Rated capacity of transformer _ Three phase 10,000 kva.
Connection of bus conductors _ Delta connection at stationary terminal rings.
Tap voltage of the transformer
  secondary, each phase _____ 133 v.
Output of transformer _____ 9,000 kw.
Total load power _____ 8,700 kw.
Power factor _____ 87.5%.

|  | Electrode | | |
| --- | --- | --- | --- |
| Items | No. 1 | No. 2 | No. 3 |
| Load voltage, v | 69 | 68 | 69 |
| Electrode current, amp | 45,000 | 44,500 | 44,500 |
| Load power, kw | 2,950 | 2,850 | 2,900 |
| Load D.C. resistance, ×10⁻³ ohm: | | | |
|   Measured | 1.45 | 1.45 | 1.45 |
|   Calculated | 1.46 | 1.44 | 1.47 |
| Load reactance, ×10⁻³ ohm: | | | |
|   Measured | 0.47 | 0.53 | 0.50 |
|   Calculated | 0.47 | 0.51 | 0.49 |

In the above tables, the values of load voltage, load power, load D.C. resistance, and load reactance are taken between the electrode contact piece and the grounded point at the bottom of the furnace.

It is apparent from the results of the performance that the reactance of the bus conductor system has been successfully reduced to a level considerably lower than that of conventional bus conductor systems of corresponding rating. Moreover, the loading characteristics at the smelting zone at each electrode are very well balanced. As the result thereof, smooth and excellent performance has been achieved in the practical running. It is also possible further to improve the performance characteristics.

As another embodiment according to the present invention, it is also possible to make the height of the delta-connected three stationary terminal rings adjustable by using bendable, both-way conductors. Thus, the ultimately low inductance of conductors, except for a transformer, electrodes and smelting zone, can be realized, by keeping the terminal rings at a lower level in the ordinary running except for repairing, etc.

In short, according to the present invention, the unbalance in the reactance among bus conductors arranged by well-known conventional systems for a three phase electric furnace, especially for an electric smelting furnace of large capacity can be substantially completely eliminated, and at the same time the inductance of the bus conductor arrangements can be reduced to an ultimately low level, while this arrangement provides a suitable mechanism for Söderberg self-baking electrodes, particularly in the case of a closed type electric smelting furnace. The inductance of the bus conductor arrangements has been considered heretofore to increase accordingly as the capacity of the electric furnace expands. On the contrary, the inventors have succeeded in providing an excellent bus conductor system capable of reducing the reactance thereof.

For an open type electric smelting furnace, in order to avoid overheating of the flexible conductors in the bus conductor arrangement according to the present invention, it is preferable to incorporate a suitable heat insulating means in the flexible conductor portion. For a tilting type electric furnace, the present invention can be adapted by making a part of the both-way conductors flexible.

Although the present invention has been described with a certain degree of particularity, it is understood that the present disclosure has been made only by way of example and that numerous changes in the details of construction and the combination and arrangement of parts may be resorted to without departing from the spirit and the scope of the present invention.

What is claimed is:

1. A bus conductor system for a three phase electric furnace having a plurality of vertically movable electrodes, said system comprising: a terminal ring for each electrode, one-way bus conductors connected to the terminal rings, multiple both-way bus conductors connected to secondary terminals of a furnace transformer at one end thereof, means permitting rearranging said multiple both-way bus conductors into the one-way conductors located at equidistant and proximate positions from adjacent terminal rings, said terminal rings being supported around each electrode concentrically, groups of flexible conductors connected to said terminal rings and to said electrodes, suspending rings suspending said conductors around each electrode in an inverse-U shape, and wire ropes suspending said suspending rings for movement vertically according to the electrode movement without slackening said groups of flexible conductors.

References Cited

UNITED STATES PATENTS

| | | | |
|---|---|---|---|
| 1,127,475 | 2/1915 | Marshall | 13—14 |
| 2,726,278 | 12/1955 | Southern | 13—14 X |
| 2,752,409 | 6/1956 | Eaton | 13—14 X |

FOREIGN PATENTS

| | | |
|---|---|---|
| 124,372 | 3/1949 | Sweden. |

BERNARD A. GILHEANY, Primary Examiner

H. B. GILSON, Assistant Examiner

U.S. Cl. X.R.

13—10